May 16, 1933.  W. F. PIOCH  1,908,786

MACHINE FOR BALANCING PISTONS

Filed Oct. 19, 1929  3 Sheets-Sheet 1

INVENTOR.
William F. Pioch,
BY
Ek Davis
ATTORNEY.

May 16, 1933.  W. F. PIOCH  1,908,786
MACHINE FOR BALANCING PISTONS
Filed Oct. 19, 1929  3 Sheets-Sheet 2

INVENTOR.
William F. Pioch.
BY
ATTORNEY.

Patented May 16, 1933

1,908,786

UNITED STATES PATENT OFFICE

WILLIAM F. PIOCH, OF DETROIT, MICHIGAN, ASSIGNOR TO FORD MOTOR COMPANY, OF DEARBORN, MICHIGAN, A CORPORATION OF DELAWARE

MACHINE FOR BALANCING PISTONS

Application filed October 19, 1929. Serial No. 400,788.

The object of my invention is to provide a piston balancing machine of simple, durable, and inexpensive construction.

Still a further object of my invention is to provide means for automatically machining automobile engine pistons to a predetermined weight so that the finished pistons may be taken at random for use in automobile engines. It is well known that in multi-cylinder reciprocating engines the oppositely moving pistons are made the same weight so that the resultant forces will balance out.

In automobile engine manufacture two methods of balancing pistons are in general use. The older method consists in machining the outside of the pistons to accurate dimensions, then weighing the pistons, and then separating the pistons into groups of approximately the same weight. All of the pistons for an engine are then picked from one of these groups so that the pistons will approximately balance each other. In the earlier type low speed engine the exact weight of the piston was not important so long as each of the pistons in the car weighed approximately the same. Consequently, this method of sorting pistons into groups was used quite extensively. A disadvantage of this method of balancing arises when the car is being serviced and a new piston is required. The service station can hardly afford to keep a complete stock of all the piston groups so that usually only the nominal size pistons and their oversizes are kept in stock. Most of the engines serviced are, therefore, out of balance when a new piston is used with an old group.

The pistons used in the present day high speed engine must be machined to an exact weight and must not only balance each other but must also weigh a predetermined amount. Crank shaft counterbalancing of these reciprocating parts is now being extensively used so that the reciprocating parts or the pistons must be machined to a predetermined weight to function with these counterbalances.

The pistons used in the modern engines are die cast and, of course, have their entire exterior surface machined. Due to the piston pin bosses and reinforcing ribs it is impossible to machine the inside of the pistons so that any variation in the core molds will cause a variation in the weight of the piston irrespective of the outside machining. The core molds used to make die cast pistons are composed of a number of pieces, usually five, which are held together in a quite intricate manner. The wear on these molds is considerable so that the pistons which are cast when the molds are new weigh considerably less than the pistons cast when the molds have been used to some extent. In fact, the life of the molds depend upon the maximum variation in the allowable weight of the pistons.

Several machines have been provided for machining pistons to a predetermined weight but all of these machines are either extremely slow in operation or they do not give consistently accurate results. The procedure in general use has been to machine the exterior, then weigh the piston, then machine away a quantity of metal from the interior of the piston skirt which the operator judges to be about the amount overweight, then re-weigh the piston and machine away another quantity of metal and so on until the piston finally reaches the predetermined weight. It is, of course, necessary to remove only small amounts of metal after each weighing operation so that the piston will at no time become underweight. As may be seen, this method is expensive and depends on the skill of the operator for its success.

A second method of producing pistons of a predetermined weight has been to clamp the piston on a balance beam of a scale and then machine away a portion of the piston skirt until the beam tips at a predetermined point and stops the machine. The disadvantage of this method is that it is impossible to rigidly support the piston so that an extremely small cut must be taken with the machine tool to prevent chattering of the work. Further, the action of the cutting tool tends to affect the scale beam so that it is almost impossible to obtain consistently accurate results with this type of machine.

The applicant's machine described in this specification utilizes a new principle for balancing pistons, this principle being the weighing of the chips removed from the piston instead of the weighing of the piston itself. The applicant's method consists in casting all of the pistons overweight, then weighing the pistons on a scale and marking the amount of overweight of each piston thereon. Each piston is then rigidly clamped on the applicant's machine and the operator then sets a balance weight on the scale beam to the amount marked on the piston head and starts the machine. A cutter machines chips from the interior of the piston and these chips are collected in a scale pan. When the weight of these chips reaches the amount which the piston is overweight, the scale beams tip and stops the machine. The pistons are rigidly clamped on the machine so that a heavy cut may be taken to completely balance the piston in only a few seconds.

The exact structure of this improved machine and a more detailed description of the operation thereof is given in the annexed specification together with the accompanying drawings in which.

Figure 3:
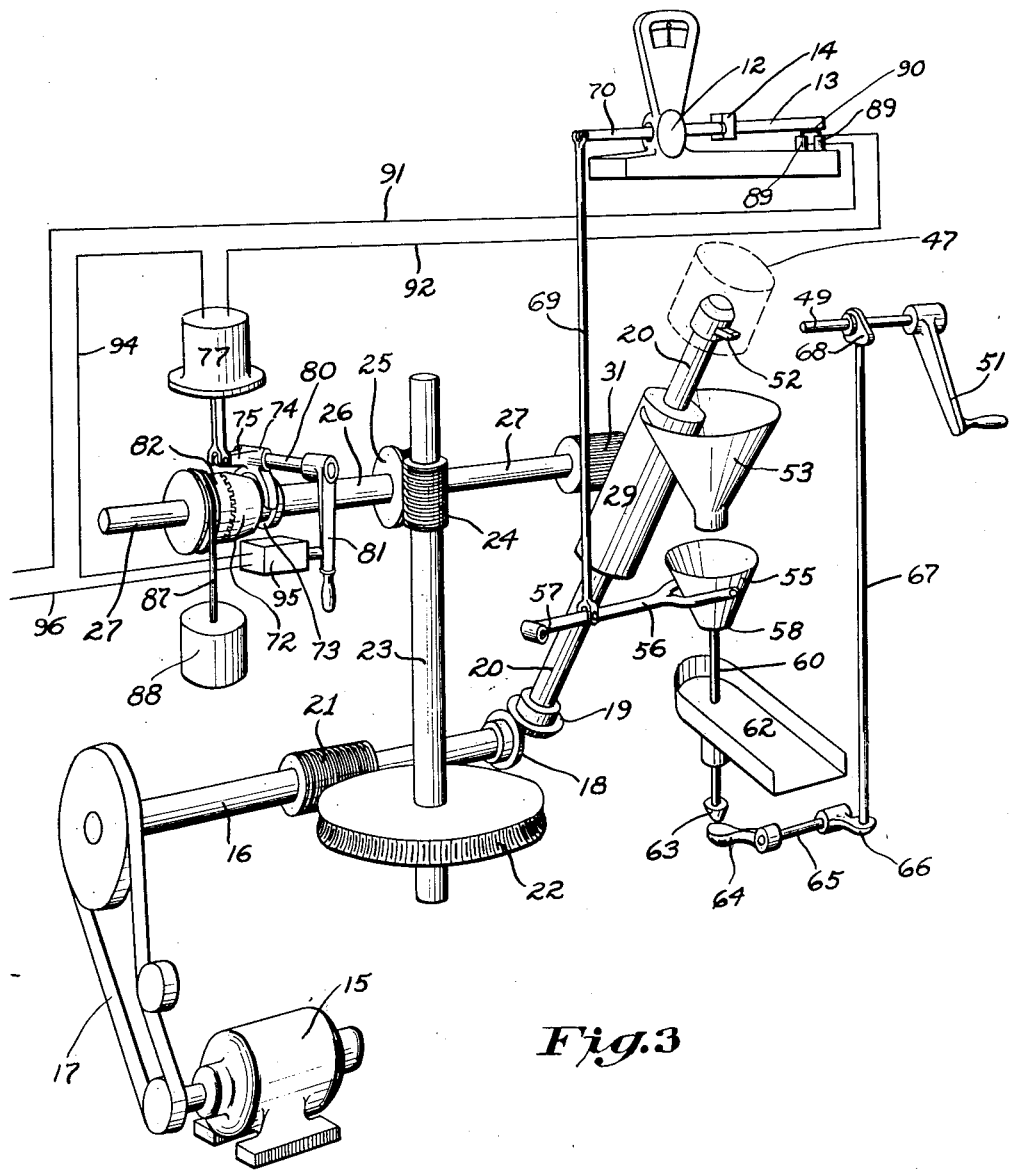

A diagrammatic view of the various rotating parts of the machine are shown in perspective in Figure 3.

Figure 1:
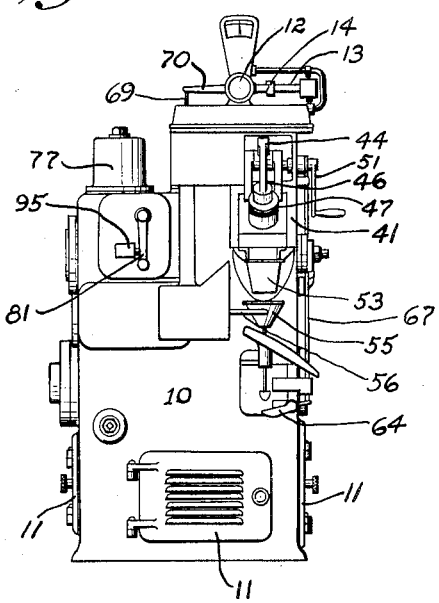
Figure 1 shows a front elevation of my improved piston balancing machine.
Figure 2:
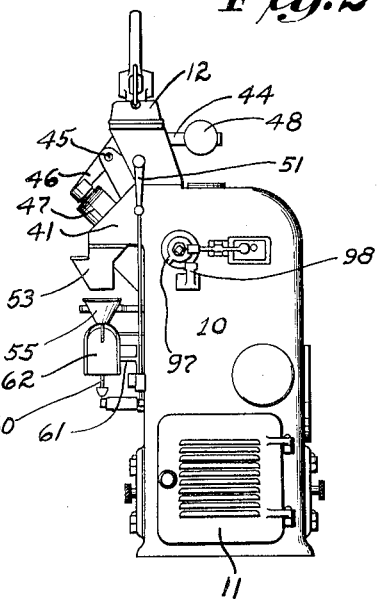
Figure 2 shows a side elevation of the machine shown in Figure 1.
Figure 5:
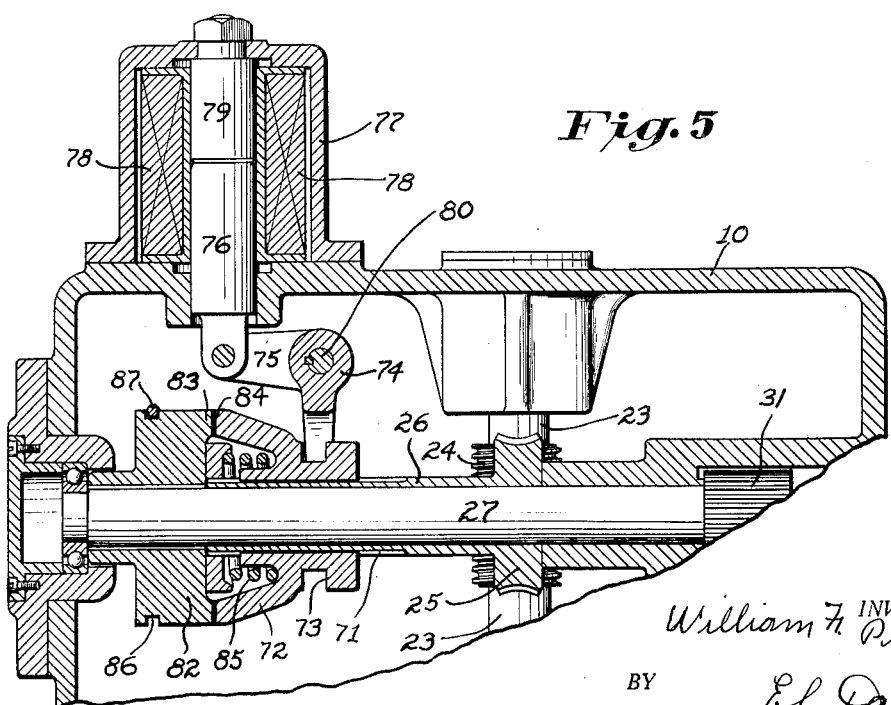
Figure 4:
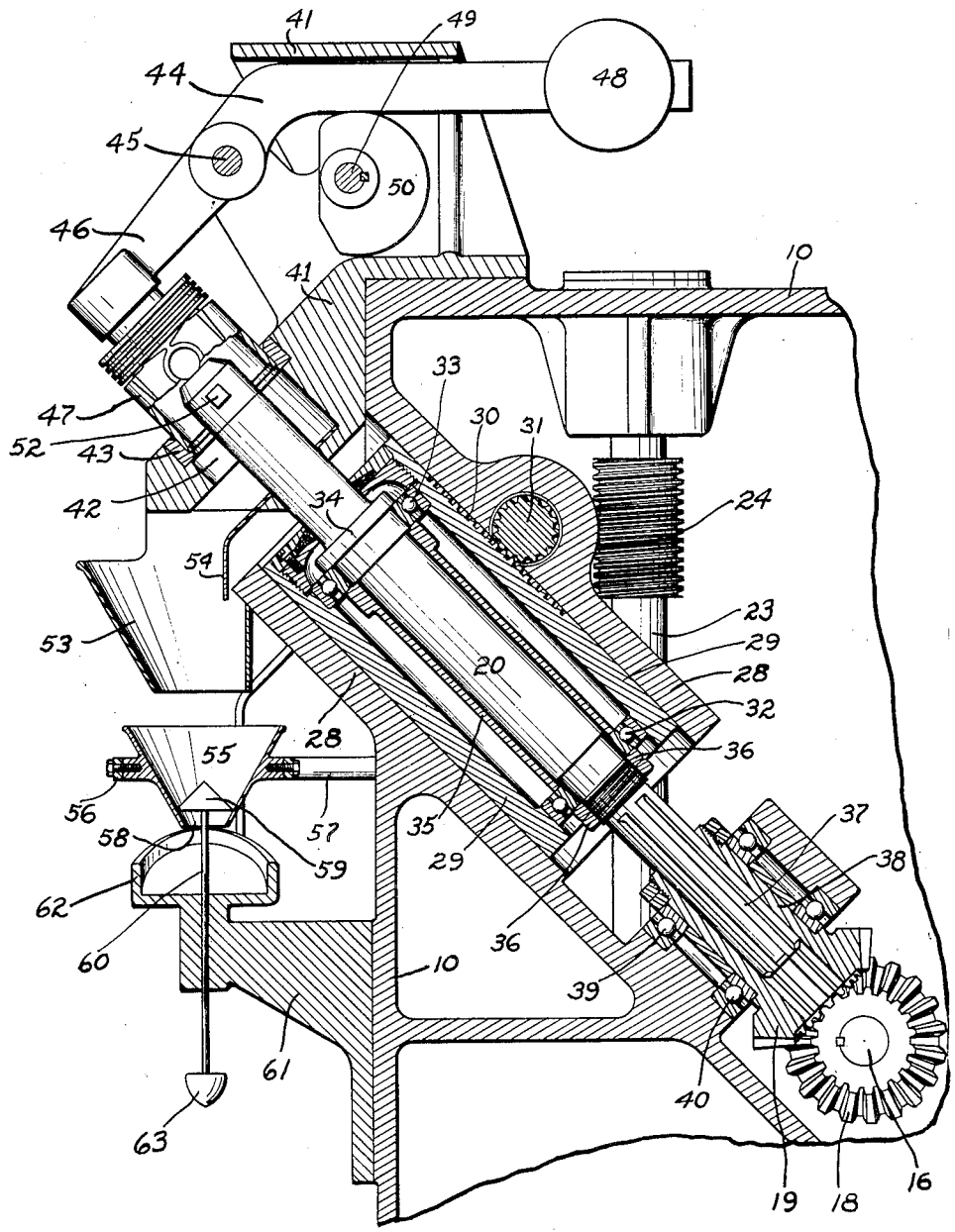

Figure 4 shows a sectional view through the piston clamping device and cutter spindle shaft, and Figure 5 shows a sectional view taken through the cutter throw out mechanism.

Referring to the accompanying drawings, I have used the reference numeral 10 to indicate the housing of my machine. This housing consists of a rectangular box shaped casting. The operating mechanism including the electric motor is housed within this member and suitable doors 11 are provided to give access to these rotating parts. A scale 12 having a balance beam 13 with a balance weight 14 slidably mounted thereon is secured on the top of the housing 10 in position conveniently accessible to the operator of the machine.

Figure 3 shows a diagrammatic view of various rotating and reciprocating parts of the machine, but it should be understood that the ends of the various shafts which are shown are suitably mounted in bearings in the housing 10, the method of illustrating in this view being only to better show the operation of the parts.

An electric motor 15 is housed in the lower part of the housing 10 and drives a transversely mounted shaft 16 through a suitable belt 17. A bevel gear 18 is provided on the opposite end of the shaft 16 which meshes with a similar bevel gear 19 operatively connected to a cutter shaft 20. A worm 21 is secured to the shaft 16 between the gears 18 and the driving end of the shaft and meshes with a worm wheel 22 which is fastened on the lower end of a vertical shaft 23. The upper end of this shaft 23 is provided with a worm 24 which is permanently in mesh with a worm wheel 25. The worm wheel 25 is fastened to one end of a sleeve 26, the sleeve being rotatably mounted on the center portion of a transverse shaft 27.

When the motor 15 is operating it drives the shaft 16 through the belt 17 which drives the shaft 23 and sleeve 27 through the worm and worm wheels 21 and 22, and 24 and 25. A suitable reduction is provided in these worm and worm wheels so that even though the shaft 16 rotates at a comparatively high speed the sleeve 26 will rotate very slowly. The cutter shaft 20 being geared through the bevel gears 18 and 19 direct to the shaft 16 rotates at approximately the same speed as this shaft.

Figure 4 illustrates the method of mounting the cutter shaft and the method of clamping the piston in the machine. The housing 10 is provided with an angularly disposed bearing 28 into which a sleeve 29 is reciprocally mounted. This sleeve 29 is provided with a number of cross teeth 30 machined therein so as to form a rack upon which a spur gear 31 is in mesh. The gear 31 is formed integrally with the shaft 27 so that when the shaft is oscillated, the sleeve 29 will be moved in and out of the bearing 28.

The cutter shaft 20 is rotatably mounted in the sleeve 29 by means of a pair of ball bearings 32 and 33. These bearings are secured to the shaft between a shoulder 34 formed on the shaft and a pair of lock nuts 36 which are screwed on the lower end of the shaft. A spacing tube 35 is disposed around the shaft 20 to space the bearings. It may thus be seen that when the sleeve 29 is reciprocated in and out of the bearing 28 the shaft 20 will also reciprocate with it.

The lower end of the shaft 20 is splined at 37 to co-act with similar splines formed in a hub 38 which extends upwardly from the bevel gear 19. The hub 38 is rotatably mounted in a pair of bearings 39 and 40 which are secured in the housing 10 of the machine. When the gear 18 is rotated it drives the gear 19 which in turn drives the shaft 20 through the splines 37 so that the shaft 20 is free to reciprocate with the sleeve 29 while being rotated by the gear 19.

A bracket 41 is secured to the upper part of the housing 10 and is provided with a bore 42 aligned with the bearing 28 in the housing. The piston 47 which is desired to be balanced is clamped in a suitable pilot 43 formed around the upper end of the bore 42 so that the upper end of the shaft 20 may extend into the skirt of the piston.

A beam 44 is pivotally mounted by a pivot pin 45 in the bracket 41 and is provided with an arm 46 extending so that it may clamp the piston 47 against the pilot 43. A counterbalancing weight 48 is provided on the outer end of the beam 44 so that it will normally remain in the inoperative position where the piston may be removed from the machine.

A transverse shaft 49 is rotatably mounted in the bracket 41 and is provided with a cam 50 arranged to co-act with the beam 44 so that when the shaft 49 is rotated, the beam will be raised to clamp the piston. An operating handle 51 is secured on the outer end of the shaft 49 for operating the clamping device.

A fly tool cutter 52 is secured in the upper end of the shaft 20 in the conventional manner so that the interior of the piston 47 may be machined by this cutter when the shaft 20 is reciprocated into the skirt or the piston. A funnel shaped collecting member 53 is secured beneath the bracket 41 and a deflector plate 54 is secured to this bracket in position to conduct the chips machined off the piston 47 by the fly tool 52 into a scale hopper 55 disposed below the lower end of the funnel 53. The hopper 55 is fastened on the outer end of an arm 56 which is pivotally mounted at 57 to the housing 10. A rod 69 is pivotally connected to the arm 56 and extends upwardly where it connects with an extension 70 from the scale beam 13.

The lower end of hopper 55 is provided with an opening 58 through which chips may be discharged from the hopper. A valve 59 is arranged in the hopper 55 in position to normally close the opening 58. This valve is secured to the upper end of a valve stem 60 which is reciprocally mounted in a bracket 61 secured to the front face of the housing 10. An inclined trough 62 is placed below the opening 58 so that the chips discharged through this opening may fall on said inclined trough and be conducted to a suitable chip receptacle.

The lower end of the valve stem 60 is provided with a shoe 63 in position to co-act with the outer end of an arm 64, the arm being secured to a shaft 65 which is rotatably mounted in the bracket 61. A second arm 66 extends from the other end of the shaft 65 and co-acts with a rod 67 which is reciprocally mounted in a vertical position on the forward face of the housing 10. This rod 67 extends upwardly to position adjacent to the clamping shaft 49. A cam 68 secured to the shaft 49 operates against the upper end of the rod 67 so that when the handle 51 is moved to the position where the piston 47 may be taken from the machine, this cam 68 will have pushed the rod 67 downwardly to thereby raise the valve stem 60 so that whatever chips may have been in the hopper 55 will be discharged in the trough 62.

As the cutter removes chips from the inside of the piston skirt, these chips drop down through the bore 42, to the plate 54, and into the collecting funnel 53. The chips then drop into the hopper 55 above the valve 59 until the weight of these chips counterbalances the weight produced by the scale weight 14. The scale beam 13 then raises and means, which will presently be described, stops the feed on the cutter shaft 20 and allows same to return to its inoperative position. The handle 51 is then moved by the operator to release the piston from the machine and this action trips the valve 59 through the rod 67 and cam 68 so that the chips in the hopper 55 fall down into the trough 62. When the chips have been discharged from the hopper it returns to its former position so that the scale beam lowers by the action of the weight 14.

A new piston is then inserted in the machine and the handle 51 returned to clamp this piston in place. The valve 59 is thus allowed to return to the bottom of the hopper 55 so that the chips machined from the new piston may be collected therein. It is, of course, necessary for the operators of the machine to set the weight 14 for each piston to correspond to its overweight so that the exact weight of chips may be removed from the piston.

The clutch throw out mechanism is illustrated in Figure 5 wherein the sleeve 26 is shown as being provided with a spline 71 on one end. A clutch collar 72 is slidably mounted on these splines 71 so as to be at all times driven by the sleeve 20. An annular groove 73 is formed in the collar 72 and co-acts with the forked end of a shifter lever 74 which is pivotally mounted in the housing 10 on a shaft 80.

An arm 75 extends horizontally from the shifter lever 74 and a solenoid plunger 76 is pivotally mounted to the outer end of this arm 75. A solenoid consisting of a housing 77, having a coil 78 therein is bolted to the top of the housing 10 and is provided with a stationary core 79 secured in its upper portion. The shaft 80 extends to the outside of the housing 10 and is provided with an operating handle 81 so that the operator may manually move the clutch collar 72 lengthwise on the sleeve 20.

A clutch member 82 is secured to the outer end of the shaft 27 adjacent to the clutch collar 72 and is provided with clutch teeth 83 which co-act with similar clutch teeth 84 formed on the clutch collar 72 so that when the handle 81 is operated the teeth on the clutch collar 72 will engage the teeth on the member 82 so that the shaft 27 will be driven by the sleeve 20.

A coil spring 85 urges the clutch member 72 and 82 out of engagement so that if it were not for the solenoid plunger 76 the operator of the machine would have to hold the clutch into engagement by the handle 81. However, when current is supplied to the solenoid 77 the plunger 76 is held in its upward position to thereby hold the clutch into engagement against the action of the spring 85.

An annular groove 86 is provided in the rear end of the clutch member 82 and one end of a cord 87 is secured therein. The cord 87 wraps around the groove and has its free end fastened to a weight 88. The weight 88 tends to rotate the shaft 27 so that the sleeve 29 and cutter shaft 20 will always be returned to their lower positions when the clutch collar 72 is thrown out of engagement with the clutch member 82. An ear 97 is secured to the outer end of the shaft 27 and co-acts with an adjustable stop 98 secured to the housing 10 so that the lower position of the cutter bar 20 may be adjusted.

A pair of cup members 89 are mounted on the base of the scale 12 and are insulated therefrom. These cup members are filled with mercury and are in a position below the scale beam 13. A U shaped connecting wire 90 is secured to this beam so that when the beam is in its lower position this connecting wire will form a contact between the mercury in the two cup members.

A wire 91 is fastened to one of the cup members 89 and extends to the elctric current source for operating the machine. A wire 92 is connected to the other cup member and extends to one terminal of the solenoid 77. The other terminal of the solenoid 77 is fastened to a wire 94 which runs to a switch 95 placed adjacent to the operating lever 81 and a wire 96 extends from the other terminal of the switch 95 to complete the circuit.

The operation of the machine is as follows:
The piston 47 is first clamped in the machine and the weight 14 moved along the beam 13 a distance equivalent to the over-weight of the piston. The beam then drops to its lower position so that the U shaped wire 90 completes the circuit between the wires 91 and 92. The operator of the machine then shifts the lever 81 which throws the clutch collar 72 into engagement with the member 82 thereby causing the shaft 27 to slowly rotate. The lever 81 also operates the switch 95 so that current flows through the solenoid 77. The solenoid plunger 76 is thus held into the solenoid 77 so that the operator may let go of the handle 81 and the clutch will still remain in its engaged position.

As the shaft 27 slowly rotates, the spur gear 31 drives the sleeve 29 upwardly so that the cutter 52 will machine away a portion of the inside of the piston skirt. The chips produced thereby drop into the hopper 55 until a sufficient number have been deposited therein to counterbalance the weight 14 on the beam 13. When this condition occurs the counterweight 14 raises and the U shaped wire 90 breaks the circuit between the wires 91 and 92 thereby stopping the current in the solenoid 77. The spring 85 then throws the clutch collar 72 out of engagement with the member 86 so that the latter is no longer driven and the weight 88 then returns the sleeve 29 and cutter bar 20 to its lower position.

The handle 81 is moved by the spring 85 so that the switch 95 is disconnected. Even though the beam 13 now drops to its normal position the circuit will still remain broken by the switch 95. The operator of the machine then moves the handle 51 to release the piston 47 and in so doing trips the valve 59 in the hopper 55 so that the chips therein are deposited in the trough 62. Another piston is then placed in the machine and the handle 51 rotated to its clamped position thereby allowing the valve 59 to close. The weight 14 is then moved along the beam 13 to position governed by the amount of metal to be taken from the new piston and the clutch again thrown in again by the handle 81. This operation is repeated for each piston.

Many advantages arise through the use of my improved device and it may be well to mention that in this machine the pistons are clamped rigidly therein so that heavy cuts may be taken by the cutter 52 to balance the piston in the shortest possible time. Further, the machine is entirely automatic so that the operator simply loads the piston into the machine and sets the counterweight on the scale to the amount marked on each piston and the machine automatically stops when the desired weight of the piston has been obtained. Further, the applicant's device does not depend upon the accurate setting of the cutting tool so that long life is obtained from these tools.

Some changes may be made in the arrangement, construction, and combination of the various parts of my improved device without departing from the spirit of my invention, and it is my intention to cover by my claims such changes as may reasonably be included within the scope thereof.

I claim as my invention:

1. In a piston balancing machine, means for clamping the piston in fixed position therein, a cutter arranged to remove material from the inside of the piston, means for collecting the chips removed by said cutter into a hopper, an electrically controlled means arranged to feed said cutter, and a weighing device arranged so that when a predetermined weight of chips have been deposited in said hopper the said electrical circuit will be broken to stop the feed of said cutter.

2. The method of forming a piston consisting of, forming said piston containing a quantity of material in excess of that required for strength and for the machining operation, then machining said piston, then weighing the piston to ascertain its overweight, then progressively machining and simultaneously collecting and weighing the chips therefrom, and then automatically stopping said machining by the weight of said chips when said weight is equivalent to said overweight.

3. In a piston balancing machine, weighing means for ascertaining the weight of said piston over and above a standard weight, means for fixedly clamping said piston in the machine, a cutter arranged to machine away chips from said piston, means for weighing said chips, and means operated by the weight of said chips for stopping said machine operation when the weight of said chips is equivalent to the overweight of said piston.

4. In a piston balancing machine, weighing means for ascertaining the weight of said piston over and above a standard weight, means for securing said piston in the machine, a tool arranged to machine away chips from said piston, means for weighing said chips, and means operated by the weight of said chips stopping said machine when the weight of the chips is equivalent to the overweight of the piston.

5. In a piston balancing machine, a tool arranged to machine away material from said piston, means for weighing said material, and means operated by the weight of said material for stopping said machine when the weight of said material is equivalent to the overweight of said piston.

6. The method of forming a piston consisting of, forming said piston containing a quantity of material in the excess of that required for strength and for the machining operations, then machining the piston, then weighing the piston to ascertain the overweight of the excess material, then progressively machining said excess material and simultaneously collecting and weighing the chips therefrom, and then stopping said machine when the weight of said chips is equivalent to said overweight.

7. The method of forming a piston consisting of, forming said piston with the skirt portion containing a quantity of material in excess of that required for strength and for the machining operations, then machining the piston, then weighing the piston to ascertain the overweight of the excess material, then progressively machining away material from the inside of said skirt and simultaneously collecting and weighing the chips therefrom, and then stopping said machine when the weight of said chips is equivalent to said overweight.

8. The method of forming a machine element of a predetermined weight comprising, forming said element containing a quantity of material in excess of that required for strength and for the machining operations, then machining the element, then weighing the element to ascertain the overweight of the excess material, then progressively machining said excess material and simultaneously collecting and weighing the chips therefrom, and then stopping said machine when the weight of said chips is equivalent to said overweight.

9. In a device for forming a machine element having a predetermined weight, a tool arranged to machine away material from said element, means for weighing said material, and means operated by the weight of said material for stopping said device when the weight of said material is equivalent to the overweight of said machine element.

WILLIAM F. PIOCH.